(12) United States Patent
Biester

(10) Patent No.: US 7,243,574 B2
(45) Date of Patent: Jul. 17, 2007

(54) ROTATING REGULATING DEVICE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 197 days.

(21) Appl. No.: 10/526,172

(22) PCT Filed: Sep. 1, 2003

(86) PCT No.: PCT/EP03/09697

§ 371 (c)(1),
(2), (4) Date: Feb. 25, 2005

(87) PCT Pub. No.: WO2004/020779

PCT Pub. Date: Mar. 11, 2004

(65) Prior Publication Data

US 2006/0037429 A1 Feb. 23, 2006

(30) Foreign Application Priority Data

Aug. 30, 2002 (DE) .......................... 202 13 389 U

(51) Int. Cl.
*F16H 27/02* (2006.01)
(52) U.S. Cl. ....................................... 74/640; 74/84.23
(58) Field of Classification Search ............... 74/89.23, 74/89.34, 640
See application file for complete search history.

(56) References Cited

U.S. PATENT DOCUMENTS

| 3,324,875 | A | 6/1967 | Anderson |
| 3,327,826 | A * | 6/1967 | Henschke .................... 192/141 |
| 5,195,721 | A | 3/1993 | Akkerman |
| 5,370,011 | A | 12/1994 | Gilges et al. |
| 5,497,672 | A | 3/1996 | Appleford et al. |
| 6,564,677 | B1 * | 5/2003 | Kiyosawa et al. ............ 74/640 |
| 6,927,513 | B2 * | 8/2005 | Schreier ................... 310/75 D |

FOREIGN PATENT DOCUMENTS

| JP | 5-196097 | * 8/1993 | .................. 74/640 |
| WO | WO 02/37008 | 5/2002 | |

OTHER PUBLICATIONS

PCT International Search Report; Appln. No. PCT/EP03/09697; dated Jan. 30, 2004; (3 p.).

* cited by examiner

*Primary Examiner*—Ha Ho
(74) *Attorney, Agent, or Firm*—Conley Rose, PC

(57) ABSTRACT

A rotating regulating device for the rotation and/or linear displacement of an actuating element of a valve, throttle, blowout preventer or similar, in particular in the field of gas or oil supply, exhibits a spindle drive and a drive train rotationally driving the spindle drive, the drive train exhibiting at least one reduction gear unit and a drive device. The rotating spindle or nut of the spindle drive exhibits at least one engaging element, essentially protruding radially outwards, which engages guide slots, whereby a first guide slot is fixed relative to a device housing and a second guide slot can be rotated relative to the device housing and/or is supported for displacement in the longitudinal direction of the rotating spindle. The guide slots exhibit at least different slopes in the longitudinal direction of the rotating spindle and the movable guide slot is connected for movement to the actuating element.

31 Claims, 2 Drawing Sheets

ROTATING REGULATING DEVICE

CROSS-REFERENCE TO RELATED APPLICATIONS

This application is a National Phase entry of PCT Application No. PCT/EP2003/009697 filed 1 Sep. 2003 which claims priority to German Application No. 202 13 389.3 filed 30 Aug. 2002, both of which are incorporated herein by reference. This application is related to the following applications: PCT Application No. PCT/EP2003/009701 filed 1 Sep. 2003 which claims priority to German Application No. 202 13 391.5 filed 30 Aug. 2003, PCT Application No. PCT/EP2003/009700 filed 1 Sep. 2003 which claims priority to German Application No. 202 13 393.1 filed 30 Aug. 2002; PCT Application No. PCT/EP2003/009698 filed 1 Sep. 2003 which claims priority to German Application No. 202 13 365.6 filed 30 Aug. 2002; PCT Application No. PCT/EP2003/009696 filed 1 Sep. 2003 which claims priority to German Application No. 202 13 364.8 filed 30 Aug. 2002; PCT Application No. PCT/EP2003/009699 filed 1 Sep. 2003 which claims priority to German Application No. 202 13 388.5 filed 30 Aug. 2002; and U.S. application Ser. No. 10/836,559 filed 30 Apr. 2004.

STATEMENT REGARDING FEDERALLY SPONSORED RESEARCH OR DEVELOPMENT

Not applicable.

BACKGROUND OF THE INVENTION

The invention relates to a rotating regulating device for the rotation and/or linear displacement of an actuating element of a valve, throttle, blowout preventer or similar, in particular in the field of gas or oil exploitation and production, with a spindle drive and a drive train driving the spindle drive rotationally, the said drive train exhibiting at least one reduction gear unit and a drive device connected to it in a manner which permits movement.

With the above mentioned devices, such as valves, throttles or similar, an actuating element is always needed which is displaced linearly, which is rotated or both rotated and linearly displaced. Due to the movement of the actuating element, with a valve, for example, an appropriate shut off body is moved. An appropriate valve opening is opened or closed by rotating, by linear displacement or by a movement of the shut-off body combined from these movements. This applies analogously to throttles with which appropriate throttle elements are swivelled, rotated or displaced by the actuating element. With blowout preventers normally two shut off elements move in a straight line towards one another to close off a bore hole. Such devices are used particularly in the field of gas and oil supply and in this respect at inaccessible places, such as for example, below the surface of the sea or even on the sea bed.

From practice such rotating regulating devices are known in which a spindle drive is rotated by a drive device with the intermediate stage of, for example, a reduction gear unit in a drive train and the appropriate rotation and/or linear movement is transferred to the actuating element from this unit.

It has in fact been shown that such previously known rotating regulating devices can be generally easily controlled and also the actuating element for the appropriate devices can move with relatively good reproducibility and accuracy. However, for a range of equipment it is necessary to be able to carry out finer regulation of the actuating element and, in particular with regard to the drive device used, to be able to achieve even greater reduction. In order to be able to carry out very fine, accurate and reproducible movements of the actuating element without complicated control of the drive device.

SUMMARY OF THE INVENTION

The object of the invention is therefore the improvement of a rotating regulating device of the type stated at the beginning such that with simple and compact construction it is possible to regulate the actuating element extremely accurately and finely in a reproducible manner even with different drive devices.

According to the invention, essentially a further reduction gear unit, which essentially is formed by guide slots with different slope in the longitudinal direction of the rotating spindle, is interposed between the spindle drive and the actuating element. One guide slot is fixed relative to a device housing of the rotating regulating device and the other guide slot is supported relative to the device housing for rotation and/or displacement in the longitudinal direction of the rotating spindle. With both guide slots at least one engaging element engages them, the said engaging element essentially protruding radially outwards from the rotating spindle or nut of the spindle drive.

The engaging element is force-guided along the fixed guide slot and due to the simultaneous engagement in the rotationally supported guide slot with different slope, the rotationally supported guide slot is rotated with respect to the fixed guide slot and, where necessary, also displaced in the longitudinal direction of the rotating spindle. Due to appropriate coupling of this movable guide slot with the actuating element, the movement of this guide slot is transferred to the actuating element. Depending on the slope of the guide slots, a further reduction of the movement of the spindle drive can occur in this way relative to the actuating element. The arrangement of an appropriate guide element on the spindle drive can be carried out in a simple manner and the formation of the guide slots can also be realized simply. There is, for example, the possibility that the guide slot fixed in the device housing is formed directly in an inner wall of this device housing. The movable guide slot can be included in a part which can be appropriately rotated relative to the device housing and/or displaced in the longitudinal direction and is then appropriately connected for movement to the actuating element.

Such an additional reduction gear unit is simply constructed and can be manufactured economically. In addition it can be used simply in the appropriate device housing of a specified size. With regard to the device housing it must be pointed out that, in particular with subsea fields of application for example, it is inserted into the relevant equipment or also replaced by remotely controlled vehicles. Only limited space is available for the device housing, whereby it is brought to the relevant equipment from outside and inserted into appropriate apertures in this equipment from the outside. Through the use of the additional reduction gear unit according to the invention the size of the device housings is not increased at all, so that they can be simply inserted even with existing equipment.

In order not to carry out constructional measures directly on the device housing and, despite this, to still be able to form the guide slots without enlarging the device housing, the guide slots can be formed in a first fixed collar mounted in the device housing and a rotating collar supported relative to the said fixed collar and at least rotatable. The guide slots overlap here at least so far that the corresponding engaging element can be inserted into both guide slots. The fixed and rotating collars are arranged around the spindle drive so that the engaging element protruding from an appropriate component of the spindle drive can engage directly in the guide slots of the surrounding collars.

In order in this connection to be able to carry out the adjustment of the rotating collar relative to the fixed collar reliably and without jamming, the first and second guide slots can be formed in pairs opposite one another relative to the rotating spindle, whereby, correspondingly, two engaging elements can be available. With one embodiment of the invention with simple construction, the rotating spindle can be supported rotationally, but axially immovable and the nut can be movable along the rotating spindle and rotatable relative to it. Here, the engaging elements or the engaging element are arranged on the nut and are rotated by it and displaced along the rotating spindle in the longitudinal direction of the rotating spindle by movement.

A spindle drive which is characterized by a long service life, low friction and so forth can be realized in that the rotating spindle and nut form a ball spindle drive.

There is the possibility that the engaging elements are formed as a single part with the ball nut and protrude from it radially outwards. However, in order to be able to use commercially available ball spindle drives, two engaging elements protruding radially outwards can be mounted, in particular releasably, on the nut. Of course, it is also possible to mount the engaging elements without a releasing feature externally on the ball nut.

It should be noted that also with pairs of first and second guide slots, they must not necessarily be formed opposite one another in the respective collars. There is also the possibility that they can be arranged at another angle, such as for example 90° or similar, with respect to one another. In order however to improve the guides of the rotating collar relative to the fixed collar, an opposing arrangement of the pairs of first and second guide slots is preferred, whereby in this respect the engaging elements are arranged in the circumferential direction of the nut, in particular at 180° spacing to one another.

The mounting of the collar is rendered more compact and is more simple if the fixed collar is directly fixed releasably to an inner wall of the device housing.

There is the possibility, for example, of bolting the fixed collar on the inside of the device housing or of mounting it on the inside wall in some other releasable manner. However, in order to simplify the mounting of the collar, at least two mounting bolts can be fitted from the direction of the device housing and in particular from the outer side of the device housing into the fixed collar from a radial direction. The mounting bolts can, for example, be formed as threaded pins which are simply screwed in from the outside of the device housing through into the fixed collar. Preferably the mounting pins do not protrude outwards beyond the device housing in the screwed-in state.

If displacement of the actuating element in the longitudinal direction can be omitted and only a rotational movement is carried out by the actuating element for the relevant equipment, the rotating collar can be supported at its ends so that it can be rotated, but not axially displaced. In this way only rotational movement is transferred via the collars to the actuating element through the movement of the spindle drive.

The construction of the rotating regulating device can be further simplified and designed more compact if the rotating collar is rotationally rigidly connected at its front end facing the actuating element to the actuating element. However, this must not be a direct joint of the actuating element and the rotating collar, but rather intermediate rings or also other components can be arranged in between them if, for example, a large distance is required between the rotating collar and the actuating element.

In order to be able to support the rotating spindle in a simple manner at both ends for rotation, the rotating collar can exhibit at the front end a ring flange which protrudes radially inwards and on which the rotating spindle is supported for rotation, especially at a first end. Consequently, no additional devices are required inside the device housing in order to support this end of the rotating spindle.

The other end of the rotating spindle can also be supported rotationally in an appropriate manner. However, in order to keep the installed length of the device according to the invention similarly small, the rotating spindle can be connected for movement with its second end to the reduction gear unit where it can be appropriately rotationally supported.

A compactly constructed reduction gear unit can be formed as a so-called harmonic drive. This harmonic drive normally comprises three components. These are a wave generator, a flexible, cup-shaped sleeve and a ring-shaped component. The ring-shaped component exhibits a tooth arrangement on its inner circumference which engages an appropriate outer tooth arrangement on the cup-shaped sleeve. However, engagement occurs only at opposite points of the cup-shaped sleeve, because it is only here that it is deflected by the wave generator until engagement with the inner tooth arrangement of the ring-shaped component is produced.

According to the invention, the flexible, cup-shaped sleeve of the harmonic drive can be connected, in particular releasably, to the second end of the rotating spindle. Analogously, the wave generator of the harmonic drive can be connected, in particular releasably, to a driven shaft of the drive train. The ring-shaped component of the harmonic drive is held rotationally rigidly inside the device housing in a suitable manner.

The motion connection to the drive device occurs via the driven shaft. The driven shaft can be formed as one part. However, to be able to adapt, depending on requirements, the length of the driven shaft in a simple manner, it can be composed of various shaft segments arranged one behind the other in the longitudinal direction of the shaft.

In order to be able to drive the driven shaft rotationally, various methods are conceivable, in particular for the connection to the drive device. Theoretically, a suitable drive motor could act directly on the driven shaft and rotate it. However, in order to be able to better utilize the available space in the housing, it is advantageous if an appropriate drive motor in the drive device does not act directly on the driven shaft, but rather—also for further reduction—is connected indirectly to it. This can, for example, occur in that a shaft segment is a spurwheel formed with an outer tooth arrangement through which the drive power is transferred from the drive device to the driven shaft.

An advantageous embodiment can be seen in that the spurwheel is a worm wheel engaging at least one worm via the outer tooth arrangement.

With another embodiment it is conceivable that the spurwheel is a helically toothed spurwheel engaging at least one helically toothed drive wheel via the outer tooth arrangement. In this manner on one hand a worm gear drive and on the other hand a double helical gear drive is formed.

In order to support the driven shaft in a simple manner again inside the device housing, the shaft segment adjacent to the spurwheel can be rotationally supported inside the device housing using pivot bearings.

In order to be able to define a setting in the end effect of the actuating element using the driven shaft, a position sensor can be assigned to the shaft segment terminating the driven shaft. Using this sensor, the rotational movement of the driven shaft is acquired which can be used to calculate a rotational movement of the actuating element, taking into account the reduction gear unit, the ball spindle drive and the rotation of the two collars relative to one another.

There is also the possibility of assigning the position sensor or also another position sensor to a different part, for example to one of the motors, the ball spindle drive, the reduction gear unit or also the rotating collar.

In order to facilitate in a simple way good transmission of the drive power with a worm drive, the relevant worm can be arranged essentially centrally on a drive shaft which is arranged perpendicular to the driven shaft. With this arrangement of the drive and driven shafts, it is possible in a simple manner to optimally exploit the available space in the device housing.

In order to be able to transfer sufficient drive power in this respect, at least one motor, in particular an electric motor, can be assigned to both ends of the drive shaft. Through the appropriate arrangement of these motors the drive shaft is also supported so that the complexity in supporting the drive shaft can be reduced.

In order to be able to use small motors, in particular small electric motors, which despite a somewhat lower power, produce an appropriately large power in combination, the drive shafts can be arranged positioned oppositely in pairs relative to the driven shaft so that two electric motors or also four or more electric motors can be assigned to each drive shaft. There is also the possibility of arranging more than two drive shafts, whereby it is also possible that more than one spurwheel is used for the worm gear or double helical gear with which the relevant drive shafts are motionally connected.

In particular when one or more motors are assigned to only one end of the relevant drive shafts, it may be regarded as advantageous if the drive shaft is supported floating at least at one end, i.e. at the end where the motors are not arranged.

In order to synchronize the rotational movements transferred by the various drive shafts, two methods are in principle conceivable. With the first method the drive shafts can be synchronized mechanically in their rotational movement using a mechanical coupling device with toothed belt, chain and so forth. With the other method the rotational movements of the drive shafts can be synchronized electronically using the electric motors. This can, for example, occur using an appropriate master/slave circuit for the electric motors.

With the mechanical coupling device there is also the possibility of driving only one of the drive shafts with appropriate motors, whereby the drive movement is transferred to the other drive shafts via the coupling device. Apart from the toothed belt, chain or similar, the mechanical coupling device includes a pinion on the relevant drive shaft with the toothed belt, chain or similar engaging the said pinion. There is also the possibility, however, that the mechanical coupling device is formed by a set of gearwheels.

With the use of a mechanical coupling device, there is furthermore also the possibility that the self-locking is not present for each drive shaft so that, for example, only an appropriate self-locking set of gears is arranged between the rotating spindle and a drive shaft, whereby the self-locking can be transferred to the other drive shafts via the mechanical coupling device.

Depending on the power requirement, it will be realized that not all of the electric motors connected to the drive shafts need to be used or also not all drive shafts connected to electric motors need to be actively rotated simultaneously. Consequently, a certain degree of redundancy in the rotating regulating device is obtained so that with the failure of one part of the drive device, such as for example an electric motor, the remainder of the drive device still facilitates proper operation of the rotating regulating device.

If a double helical gear or pairs of double helical gears composed of helically toothed drive gears and spurwheel are used, the relevant drive shaft can be arranged parallel to the driven shaft.

With the worm gear and the double helical gear it must be noted that they are normally formed to be self-locking. Consequently, independent reverse rotation of the actuating element is prevented even when the drive device fails.

With regard to the double helical gear it must be noted that it normally exhibits a higher efficiency than a worm gear, it is relatively low noise, exhibits no axial loads, has a high service life and in contrast to the worm gear, exhibits line contact on the tooth flanks in the relevant tooth arrangement. With the double helical gear, a diagonal angle of the teeth of up to 80° or more is possible in this respect so that the spurwheel or drive wheel, where necessary, only exhibits one tooth.

With the double helical gear and also with the worm gear, it is possible that at least two motors are assigned to one end of the drive shaft. Of course, two or more motors and in particular electric motors can be arranged at both ends of the drive shafts.

In order to facilitate a further reduction in the region of the drive device, a reduction gear unit, in particular a harmonic drive, can be arranged between the motor and the helically toothed drive wheel.

With this harmonic drive there is the possibility that the drive shaft is connected to the flexible, cup-shaped sleeve of the harmonic drive and the helically toothed drive wheel is connected to the wave generator.

BRIEF DESCRIPTION OF THE DRAWINGS

In the following, advantageous embodiments of the invention are explained based on the figures enclosed in the drawing.

The following are shown.

DESCRIPTION OF THE PREFERRED EMBODIMENTS

Figure 1:
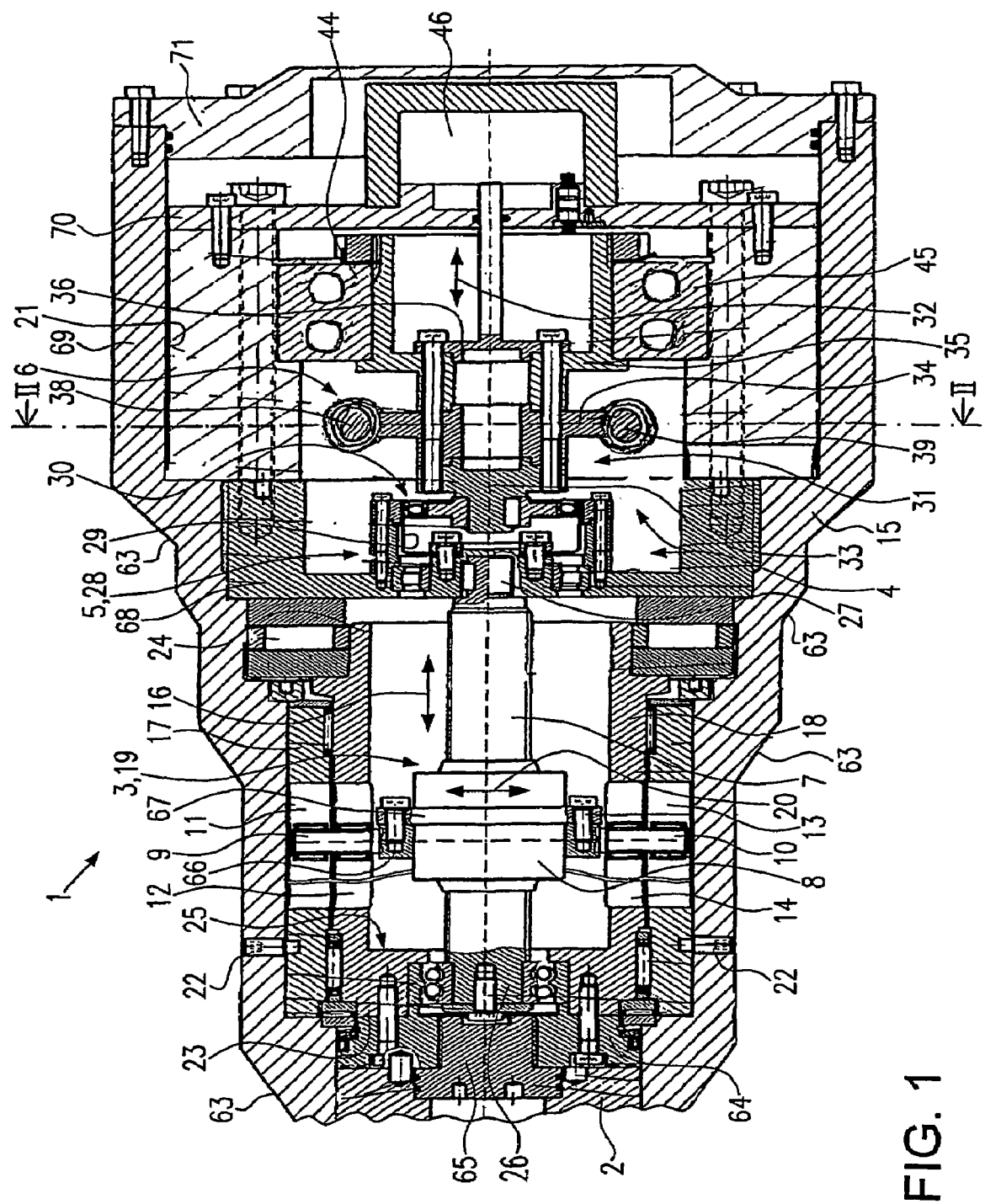
FIG. 1 A longitudinal section through a first embodiment of a rotating regulating device according to the invention which corresponds to a section along I-I in FIG. 2.

FIG. 1 shows a longitudinal section through a first embodiment of a rotating regulating device 1 according to the invention. It exhibits a device housing 15 which tapers in the direction towards the actuating element 2 in steps via appropriate locating surfaces 63. The actuating element 2 is only shown in part and is used for the regulation of an appropriate valve or throttle stage after insertion of the rotating regulating device 1 into an appropriate recess on a device such as a valve, throttle or similar.

The actuating element 2 is connected to a rotating collar 18 at its end visible in FIG. 1. An intermediate ring 64, which is fastened releasably at the end 23, is arranged between the relevant end 23 of the rotating collar 18 and the actuating element 2. The actuating element 2 is held rotationally rigidly relative to this intermediate ring 64.

A pot-shaped insertion element 65 is arranged for covering an opening in the intermediate ring and an opening in a ring-flange 25 protruding radially inwards at the end 23 of the rotating collar 18. In the opening of the ring-flange 25, a first end 26 of a rotating spindle 7 is supported for rotation, but is immovable in the longitudinal direction of the rotating spindle 16. The rotating spindle 7 forms part of a spindle drive 3 and also exhibits a nut 8, whereby the spindle drive is formed as the ball spindle drive 19.

The rotating spindle 7 is also supported rotationally at its second end 27 which is opposite the first end 26. The recirculating ball nut 8 can be displaced in the longitudinal direction of the rotating spindle 16 with appropriate rotation of the rotating spindle 7 and can also be rotated relative to the rotating spindle. At a minimum of two points, the recirculating ball nut 8 exhibits engaging elements 9, 10 on its outside which protrude radially outwards. They protrude from a retention ring 66 surrounding the ball nut 8 and which is releasably fastened to the recirculating ball nut 8 by a clamping ring 67. The two engaging elements 9, 10 engage the guide slots 11, 12 and 13, 14 which are formed in pairs positioned opposite relative to the rotating spindle 7 in the rotating collar 18 or a fixed collar 17. The guide slots 12, 14 are formed in the rotating collar 18 and the guide slots 11, 13 in the fixed collar 17. The slopes of the guide slots 11, 13 and 12, 14 are different in the longitudinal direction of the rotating spindle 16, whereby the corresponding guide slots, for example, can be formed X-shaped relative to one another. The corresponding engaging elements 9, 10 engage in the guide slots 11, 13 and 12, 14 at the point where they overlap.

The fixed collar 17 is held rotationally rigidly on an inner wall 21 of the device housing 15 and also immovably in the longitudinal direction of the rotating spindle 16. The rotationally rigid mounting is provided by at least two mounting bolts 22 inserted through the device housing 15 from outside into the fixed collar 17, the said bolts being able to be screwed into the device housing 15, for example, so that they extend into a corresponding hole in the fixed collar 17. Furthermore, the fixed collar 17 is held at its ends in a positive locking manner by shoulders on the inner wall 21 of the device housing 15 or by appropriately arranged contact elements. Appropriate pivot bearings are arranged between the fixed collar 17 and the rotating collar 18 as well as in particular at the ends 23 and 24 of the rotating collar 18.

The rotating spindle 7 is connected at its end 27 with a reduction gear unit 5 formed as a harmonic drive 28. In particular, connection is made to a cup-shaped, flexible sleeve 29 of the harmonic drive 28. This sleeve exhibits a tooth arrangement on its outer side which engages at two opposing points with an inner tooth arrangement of a ring-shaped component of the harmonic drive 28, the said component being fixed relative to the device housing 15. The opposing engaging points are defined by the wave generator 30 as another part of the harmonic drive 28. This exhibits an approximately oval shape and when rotated, it presses the relevant engaging points of the flexible sleeve 29 outwards in engagement with the inner tooth arrangement of the stationary component.

The wave generator 30 is connected to a driven shaft 31 composed of shaft segments 33, 34, 35 and 36. The different shaft segments are releasably joined together with threaded bolts.

The first shaft segment 33 provides the joint to the wave generator 30 and a shaft segment 34 formed as a spurwheel is adjacent to it. The spurwheel exhibits an outer tooth arrangement 37 on its outer circumference, see also FIG. 2. Adjacent to the spurwheel 34 as another shaft segment is a somewhat cup-shaped component which is closed off by the last shaft segment 36 positioned opposite the spurwheel 34. The cup-shaped component exhibits a cylindrical section which is rotationally supported by pivot bearings 44, 45 relative to the device housing 15. A position sensor 46 is furthermore assigned to the shaft segment 36, the said sensor being capable of measuring an appropriate rotational movement of the shaft segment 36 and therefore of the driven shaft 31. An approximately bar-shaped probe element running in the longitudinal direction of the shaft is arranged between the shaft segment 36 and the position sensor 46.

Figure 2:
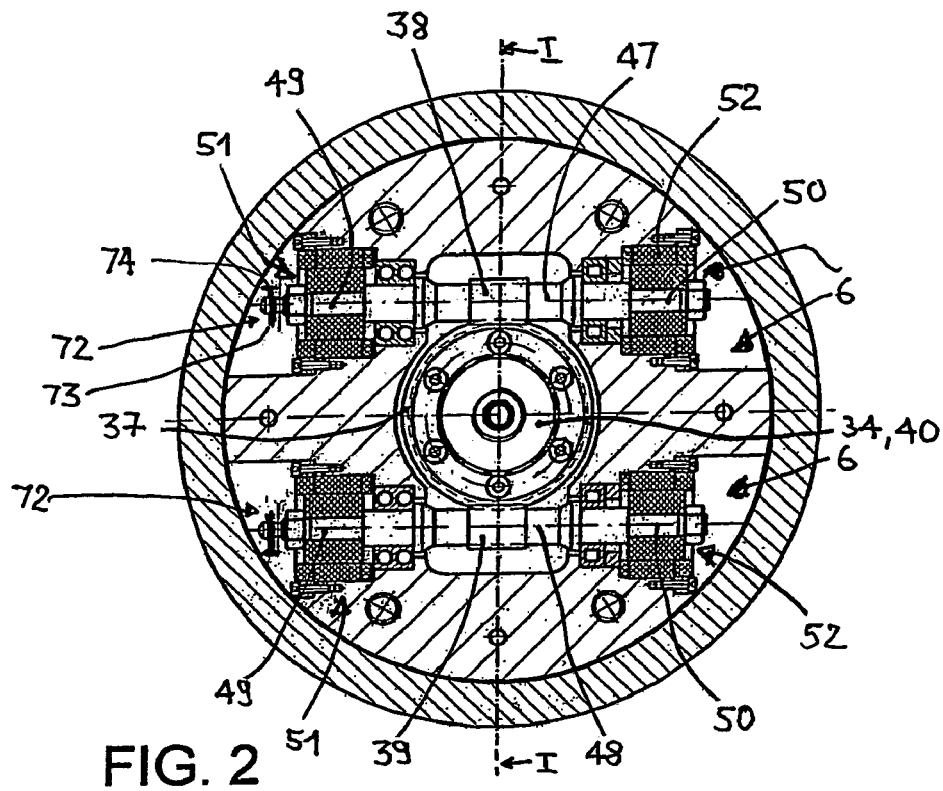
FIG. 2 A section along the line II-II in FIG. 1.
Figure 3:
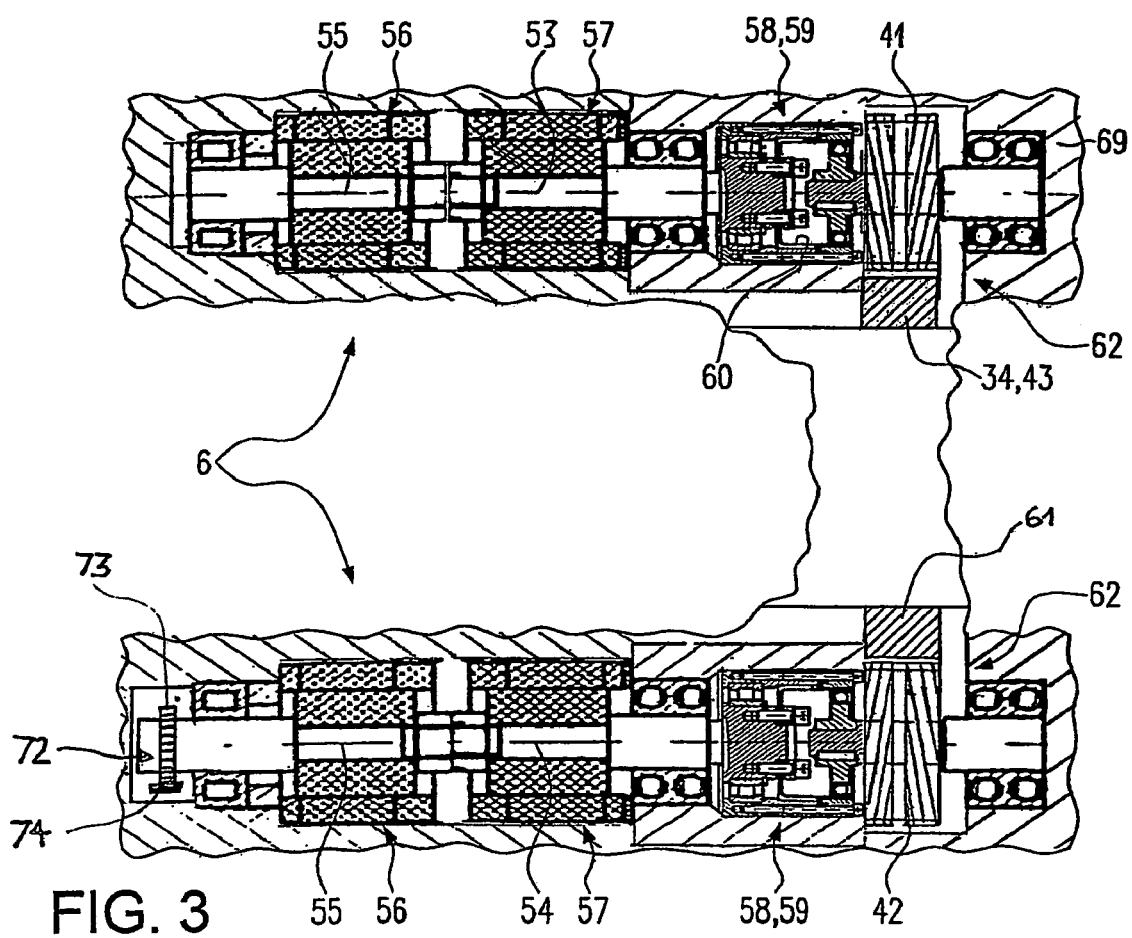
FIG. 3 A detail drawing from FIG. 1 with another embodiment according to the invention with a pair of double helical gears.

In the region of the reduction gear unit 5 and the driven shaft 31 further housing parts are inserted into the device housing 15. One of these housing parts is a shell-shaped housing part 68 which with interposition, for example, of ball bearings or similar is also used to support the end 24 of the rotating collar 18 and for mounting the harmonic drive 28. The housing part 68 exhibits an approximately central opening in which a pivot bearing for the end 27 of the rotating spindle 7 is arranged. Adjacent to the housing part 68 there is a collar type housing part 69 which is releasably connected both to the device housing 15 and also to the housing part 68. The driven shaft 31 and the drive device, see FIGS. 2 and 3, are arranged in essentially the interior free space in the housing part 69. The housing part 69 is enclosed by a cover component 70 positioned opposite the other housing part 68. The probe element of the position sensor 46 protrudes through the cover component 70.

Approximately parallel to the cover component 70, a housing cover 71 is arranged which accommodates the position sensor 46 in an appropriate receptacle.

The drive device is connected for movement with the driven shaft 31 via the spurwheel 34 as shaft segment.

With the embodiment according to FIG. 1, the spurwheel 34 is formed as a worm wheel 40, see also FIG. 2, which engages the corresponding worms 38, 39 at a minimum of two opposite positions.

FIG. 2 corresponds to a section along the line II-II in FIG. 1 and shows an embodiment of an appropriate drive device 6. The worms 38 and 39, see also FIG. 1, are arranged approximately centrally on the drive shafts 47, 48. The ends of these drive shafts 47, 48 are assigned to electric motors 49 and 50 as drive motors. The drive shafts 47, 48 extend into the electric motors 49, 50, whereby pivot bearings are arranged between them and the worms 38, 39. The free ends of the drive shafts 47, 48 are respectively joined to the electric motors 49, 50. The electric motors 49, 50 themselves are mounted releasably in the housing part 69.

The drive shafts 47 and 48 are arranged opposite relative to the worm wheel 40 and appropriately engage its outer tooth arrangement 37. There is the possibility of arranging more than two drive shafts, such as for example four drive shafts. All these drive shafts can act on the one worm wheel 40. There is also the possibility that a second worm wheel 40 is arranged with a parallel offset to the first worm wheel on the driven shaft 31 and engages further appropriate worms 38, 39 on drive shafts 47, 48.

The previously described worm gear is generally formed self-locking so that independent reverse rotation of the rotating spindle 7, for example with the failure of the drive device, is not possible.

A further self-locking gear is described as the second embodiment in FIG. 3. This is a double helical gear 62, two of which are provided. Whereas with the worm gear according to FIG. 2, the drive shafts 47, 48 are arranged perpendicular to the driven shaft 31, with the double helical gear 62 the corresponding drive shafts 53, 54 are arranged parallel to the driven shaft 31. For simplification the remaining parts of the rotating regulating device according to FIG. 1 have been left out in the second embodiment according to FIG. 3. It can be seen that the spurwheel 34 formed as a helically toothed spurwheel 43 engages correspondingly helically toothed drive wheels 41, 42 with its outer tooth arrangement. The said drive wheels are rotationally supported on a stub axle which is supported rotationally at one end in the housing part 69 and rotationally supported at the other end via a wave generator 61 of another harmonic drive 59 as gear reduction unit 58. The wave generator 61 presses a suitably flexible, cup-shaped sleeve 60 outwards at opposite positions so that its outer tooth arrangement engages an inner tooth arrangement arranged on a fixed ring element as a further part of the harmonic drive 59. In each case one of the drive shafts 53, 54 is rotationally rigidly connected to the cup-shaped sleeve 60. The drive shafts 53 and 54 are each rotationally supported adjacent to the harmonic drive 59 and at the opposite end. Electric motors 56, 57 are arranged respectively on the drive shafts 53 and 54.

Such a double helical gear is characterized by a high efficiency, long service life, low noise, no axial loading and other advantages. Reductions with self-locking of lower than 1:25 and lower than 1 are possible.

Also with the double helical gear 62 according to FIG. 3, more than two of these gears can be arranged simultaneously and can act on one helically toothed spurwheel 43. Similarly, there is the possibility that two of the helically toothed spurwheels 43 can be arranged spaced relative to one another on the driven shaft 31 and can engage helically toothed drive wheels 41, 42.

In the embodiments according to FIGS. 2 and 3, a mechanical coupling device 72 is displayed as another alternative. With this device the various drive shafts are mechanically synchronized in their rotational movements. Furthermore, the mechanical coupling device can also be used to transfer the drive power from a drive shaft fitted with appropriate motors to other drive shafts, where applicable, not fitted with motors and to also transfer the self-locking and self-braking with the various gear devices to all drive shafts. In such a case, even with the arrangement of multiple drive shafts, the arrangement of only one self-locking set of gears is sufficient between one drive shaft and the rotating spindle so that, for example, one worm 38, 39 or a helically toothed drive wheel 42 is sufficient.

With the illustrated embodiment for the mechanical coupling device 72, it exhibits in each ease a pinion 73 arranged on a drive axle and a chain or a toothed belt 74 which couples all pinions together. There is also the possibility that instead of the chain or belt 74, a gearwheel or instead of the pinion and chain or toothed belt, a set of gearwheels is used.

Appropriate combinations of mechanical coupling device, motors for the drive shafts, self-locking sets of gears, etc. are obvious.

In the following, the functioning principle of the rotating regulating device according to the invention is described based on the figures.

With control of the electric motors and appropriate rotation of the drive shafts, this rotation is transferred via a worm or a double helical gear to the driven shaft and from this to the reduction gear unit 5 and then to the rotating spindle 7. Here, the rotational movement is converted via the recirculating ball nut 8 into a linear movement with at least partial rotation of the recirculating ball nut 8 about the rotating spindle 7. With the movement of the recirculating ball nut in the longitudinal direction of the rotating spindle 16, the rotating collar 18 is rotated with respect to the fixed collar 17 by the engagement of the engaging elements 9, 10 in the corresponding guide slots 11, 12 on one hand and 13, 14 on the other. Since the rotating collar 18 is connected for movement with the actuating element 2, the appropriate rotation is transferred to the said actuating element 2. An independent reverse rotation of the actuating element is prevented by the self-locking characteristic of the worm gear or the double helical gear.

It has been pointed out in the beginning that apart from pure transmission of a rotational movement to the actuating element, with appropriate longitudinal displacement capability of the rotating collar 18, transfer of a movement in the longitudinal direction of the spindle 16 onto the actuating element 2 is possible in addition to the actual rotational movement or also without rotational movement.

The invention claim is:

1. Rotating regulating device for the rotation and/or linear displacement of an actuating element comprising:
    a device housing;
    a spindle drive within the device housing comprising;
        a rotating spindle; and
        a nut surrounding and moveable in the longitudinal direction along the rotating spindle upon rotation of the spindle and comprising at least one engaging element protruding radially from the nut;
    a drive train rotationally driving the spindle drive and comprising:
        at least one reduction gear unit; and
        a drive device connected to the at least one reduction gear unit for movement;
    a fixed collar fixed from relative movement with respect to the device housing and comprising a fixed collar guide slot;
    a rotating collar rotatable within the device housing and comprising a rotatable collar guide slot, the slope of the rotatable guide slot being angled with respect to the slope of the fixed guide slot in the longitudinal direction;
    the at least one engaging element being in traveling engagement with both the fixed collar guide slot and the rotating collar guide slot, rotation of the nut being prevented by the engagement of the at least one engaging element in the fixed collar guide slot;
    the rotating collar being rotatable by the travel of the at least one engaging element in the longitudinal direction through the rotating collar guide slot; and
    the actuating element being rotatable by the rotation of the rotating collar.

2. Rotating regulating device according to claim 1, the fixed collar and the rotating collar comprising more than one guide slot formed in opposing pairs relative to the rotating spindle and the nut comprising more than one engaging element.

3. Rotating regulating device according to claim 1, characterized in that the rotating spindle is supported so that it can be rotated, but is axially immovable, and the nut can be displaced along the rotating spindle.

4. Rotating regulating device according to claim 1, characterized in that the rotating spindle and nut form a ball spindle chive.

5. Rotating regulating device according to claim 1, the engaging element being releasably fastened to the nut.

6. Rotating regulating device according to claim 2, characterized in that the engaging elements are arranged spaced to one another in the circumferential direction of the nut.

7. Rotating regulating device according to claim 1, characterized in that the fixed collar is fixed releasably to an inner wall of the device housing.

8. Rotating regulating device according to claim 1, characterized in that at least two mounting bolts are fitted from the direction of the device housing into the fixed collar from a radial direction.

9. Rotating regulating device according to claim 1, characterized in that the rotating collar can be rotated at its ends, but is supported so that it is axially immovable.

10. Rotating regulating device according to claim 1, characterized in that the rotating collar is rotationally rigidly connected at its end facing the actuating element to the actuating element.

11. Rotating regulating device according to claim 1, characterized in that the rotating collar exhibits a ring-flange on its font end, protruding radially inwards, on which the rotating spindle is supported rotationally.

12. Rotating regulating device according to claim 1, characterized in that the rotating spindle is connected for movement by its second end to the reduction gear unit.

13. Rotating regulating device according to claim 1, characterized in that the reduction gear unit comprises a harmonic drive.

14. Rotating regulating device according to claim 13, characterized in that a flexible, cup-shaped sleeve of the harmonic drive is connected to an end of the rotating spindle.

15. Rotating regulating device according to claim 14, characterized in that a wave generator of the harmonic drive is connected to a driven shaft of the drive train.

16. Rotating regulating device according to claim 15, characterized in that the driven shaft is composed of different shaft segments, arranged one behind the other.

17. Rotating regulating device according to claim 16, characterized in that a shaft segment is a spurwheel formed with an outer tooth arrangement.

18. Rotating regulating device according to claim 17, characterized in that the spurwheel is a worm wheel engaging at least one worm via the outer tooth arrangement.

19. Rotating regulating device according to claim 17, characterized in that the spurwheel is a helically toothed spurwheel engaging at least one helically toothed drive wheel via the outer tooth arrangement.

20. Rotating regulating device according to claim 17, characterized in that the shaft segment adjacent to the spurwheel is supported rotationally inside the device housing using pivot bearings.

21. Rotating regulating device according to claim 16, characterized in that a position sensor is assigned to the shaft segment terminating the driven shaft.

22. Rotating regulating device according to claim 18, characterized in that the worm is essentially arranged centrally on a drive shaft which is arranged perpendicular to the driven shaft.

23. Rotating regulating device according to claim 22, characterized in that at least one motor is assigned to both ends of the drive shaft.

24. Rotating regulating device according to claim 23, further comprising more than one drive shaft characterized in that drive shafts are arranged in pairs opposite relative to the driven shaft.

25. Rotating regulating device according to claim 22, characterized in that the drive shaft is at least supported floating at one end.

26. Rotating regulating device according to claim 24, characterized in that the drive shafts ate mechanically synchronized in their rotational movements.

27. Rotating regulating device according to claim 24, characterized in that the drive shafts arc electronically synchronized in their rotational movement using the motors.

28. Rotating regulating device according to claim 19, characterized in that the drive device comprises a double helical gear comprising the helically toothed drive wheel and the helically toothed spurwheel, the helically toothed drive wheel being arranged on at least one drive shaft arranged parallel to the driven shaft.

29. Rotating regulating device according to claim 28, characterized in that at least two motors are assigned to an end of said at least one drive shaft.

30. Rotating regulating device according to claim 19, characterized in that the reduction gear unit is arranged between a motor and a helically toothed drive wheel.

31. Rotating regulating device according to claim 28, characterized in that the drive shaft is connected for movement to the flexible, cup-shaped sleeve of the harmonic drive and the helically toothed drive wheel is connected for movement to the wave generator.

* * * * *